US012104846B2

(12) United States Patent
Scalf et al.

(10) Patent No.: US 12,104,846 B2
(45) Date of Patent: Oct. 1, 2024

(54) REFRIGERATOR WITH QUICK FILL DISPENSER INCORPORATING REMOVABLE FLUID STORAGE RECEPTACLE AND COMBINED INLET/OUTLET

(71) Applicant: Midea Group Co., Ltd., Foshan (CN)

(72) Inventors: Eric Scalf, Louisville, KY (US); Vinayak Naik, Louisville, KY (US); Michael Gaunt, Pikeville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 288 days.

(21) Appl. No.: 17/465,178

(22) Filed: Sep. 2, 2021

(65) Prior Publication Data

US 2023/0064175 A1 Mar. 2, 2023

(51) Int. Cl.

| | |
|---|---|
| ***F25D 25/00*** | (2006.01) |
| ***B67D 1/00*** | (2006.01) |
| ***F25D 23/02*** | (2006.01) |
| ***F25D 23/12*** | (2006.01) |

(52) U.S. Cl.

CPC ........... *F25D 25/00* (2013.01); *B67D 1/0009* (2013.01); *B67D 1/0085* (2013.01); *F25D 23/028* (2013.01); *F25D 23/126* (2013.01); *B67D 2210/00036* (2013.01); *F25D 2323/122* (2013.01)

(58) Field of Classification Search

CPC ...... F25D 25/00; F25D 23/028; F25D 23/126; F25D 2323/122; B67D 1/0009; B67D 1/0085; B67D 2210/00036

See application file for complete search history.

(56) References Cited

U.S. PATENT DOCUMENTS 2,341,872 A * 2/1944 Kasold .................. F25D 23/126 202/180
2,777,304 A 1/1957 Nave
2,781,153 A * 2/1957 Roberts ................. F25D 23/126 222/509
3,208,641 A 9/1965 Brugioni
(Continued)

FOREIGN PATENT DOCUMENTS

BR PI1002793 A2 4/2012
CN 1707206 A 12/2005
(Continued)

OTHER PUBLICATIONS

European Patent Office, Extended European Search Report issued in Application No. 22790656.7, 14 pages, dated Nov. 21, 2023.
(Continued)

*Primary Examiner* — Nelson J Nieves

(74) *Attorney, Agent, or Firm* — Gray Ice Higdon

(57) ABSTRACT

A refrigerator utilizes a quick fill dispenser that incorporates a fluid storage receptacle that is easily removable for cleaning and/or dispensing independently of the refrigerator, and that is coupled to a dock through a combined inlet/outlet through which the receptacle is filled and fluid is dispensed through the receptacle. A dock closure may also be used to inhibit fluid flow through the combined inlet/outlet when the fluid storage receptacle is removed.

18 Claims, 8 Drawing Sheets

(56) References Cited

U.S. PATENT DOCUMENTS

| | | | | |
|---|---|---|---|---|
| 4,255,937 | A * | 3/1981 | Ehrlich | C02F 1/18 62/291 |
| 4,715,401 | A | 12/1987 | Staun et al. | |
| 5,490,547 | A * | 2/1996 | Abadi | B67D 3/0009 141/82 |
| 5,511,388 | A * | 4/1996 | Taylor | F25D 23/126 62/506 |
| 5,542,265 | A * | 8/1996 | Rutland | B67D 1/0858 62/338 |
| 5,560,393 | A | 10/1996 | Clack | |
| 5,768,905 | A * | 6/1998 | Oh | B67D 1/0858 62/264 |
| 5,813,246 | A * | 9/1998 | Oh | F25D 23/126 137/614.04 |
| 5,857,596 | A | 1/1999 | Lee | |
| 5,971,213 | A | 10/1999 | Lee | |
| 6,003,734 | A * | 12/1999 | Oh | B67D 3/02 141/357 |
| 6,418,742 | B1 | 7/2002 | Chaney | |
| 6,648,187 | B1 | 11/2003 | Shypkowski | |
| 7,076,966 | B2 * | 7/2006 | Mullen | B67D 1/0891 62/337 |
| 7,188,486 | B2 | 3/2007 | Olive et al. | |
| 7,596,964 | B2 | 10/2009 | Lim et al. | |
| 7,658,212 | B2 * | 2/2010 | Meuleners | F25D 23/126 62/391 |
| 8,763,422 | B2 | 7/2014 | Zentner et al. | |
| 9,115,930 | B2 | 8/2015 | Park et al. | |
| 9,568,240 | B2 | 2/2017 | Hall et al. | |
| 9,651,296 | B2 | 5/2017 | An | |
| 9,709,321 | B2 | 7/2017 | Yang | |
| 9,752,820 | B2 | 9/2017 | Yang | |
| 10,563,909 | B2 * | 2/2020 | Scalf | B67D 1/0011 |
| 10,955,187 | B2 | 3/2021 | Scalf et al. | |
| 11,215,394 | B2 * | 1/2022 | Park | F25D 23/028 |
| 2005/0178273 | A1 * | 8/2005 | Meuleners | B67D 1/0858 99/279 |
| 2007/0000949 | A1 | 1/2007 | Bosi | |
| 2008/0168791 | A1 * | 7/2008 | Nebbia | F25D 21/14 62/389 |
| 2009/0126392 | A1 | 5/2009 | An et al. | |
| 2009/0165494 | A1 | 7/2009 | Muthumani | |
| 2010/0031675 | A1 * | 2/2010 | Kim | F25C 1/08 62/73 |
| 2010/0275633 | A1 | 11/2010 | An et al. | |
| 2010/0293986 | A1 | 11/2010 | Jung | |
| 2011/0232312 | A1 * | 9/2011 | Bortoletto | F25D 17/042 62/274 |
| 2011/0303693 | A1 | 12/2011 | Culley et al. | |
| 2012/0111031 | A1 | 5/2012 | Lee et al. | |
| 2012/0195577 | A1 | 8/2012 | Lee | |
| 2012/0297814 | A1 | 11/2012 | Kim et al. | |
| 2013/0105513 | A1 | 5/2013 | Krause et al. | |
| 2013/0108249 | A1 | 5/2013 | Krause et al. | |
| 2014/0217121 | A1 | 8/2014 | Fernandez | |
| 2014/0238502 | A1 * | 8/2014 | Ko | F25D 23/126 261/75 |
| 2015/0197417 | A1 | 7/2015 | Stagg et al. | |
| 2016/0201979 | A1 * | 7/2016 | Park | F25D 11/02 62/389 |
| 2016/0209108 | A1 | 7/2016 | Bird | |
| 2019/0093942 | A1 | 3/2019 | Scalf et al. | |
| 2020/0030725 | A1 * | 1/2020 | Laible | F25D 23/126 |
| 2020/0182525 | A1 * | 6/2020 | Scalf | F25D 23/069 |
| 2020/0182533 | A1 | 6/2020 | Scalf et al. | |
| 2020/0182535 | A1 | 6/2020 | Scalf | |
| 2021/0063071 | A1 | 3/2021 | Scalf | |
| 2021/0190414 | A1 | 6/2021 | Scalf et al. | |

FOREIGN PATENT DOCUMENTS

| | | | |
|---|---|---|---|
| CN | 1964913 | A | 5/2007 |
| CN | 102209682 | A | 10/2011 |
| CN | 102374715 | A | 3/2012 |
| CN | 102374742 | A | 3/2012 |
| CN | 105371576 | A | 3/2016 |
| CN | 106642953 | A | 5/2017 |
| CN | 207113363 | U | 3/2018 |
| CN | 109959213 | A | 7/2019 |
| CN | 110440500 | A | 11/2019 |
| CN | 111492190 | A | 8/2020 |
| CN | 113330261 | A | 8/2021 |
| EP | 1190983 | B1 | 11/2003 |
| EP | 3406992 | A1 | 11/2018 |
| JP | S61163490 | A | 7/1986 |
| KR | 20120039885 | A | 4/2012 |
| KR | 20130061430 | A | 6/2013 |
| WO | WO2010119016 | A2 | 10/2010 |

OTHER PUBLICATIONS

2-Faucet Beer Refrigerator, Beverage Factory, May 19, 2017.

International Search Report and Written Opinion issued in Application No. PCT/CN2018/074179 dated Jun. 13, 2018.

GE, GE WR17X11440 Water Tank Dispenser Assembly for Refrigerator, www.amazon, Retrieved on Sep. 14, 2018.

Amazon, Leakproof 1-Gallon Refrigerator Water Bottle with Faucet & Screw Cap, www.amazon.com, Retrieved on Sep. 14, 2018.

International Search Report and Written Opinion issued in Application No. PCT/CN2019/094321 dated Sep. 26, 2019.

U.S. Patent Office; Office Action issued in U.S. Appl. No. 15/715,887 dated Jan. 10, 2019.

U.S. Patent Office; Notice of Allowance issued in U.S. Appl. No. 15/715,887 dated Oct. 8, 2019.

U.S. Patent Office; Corrected Notice of Allowance issued in U.S. Appl. No. 15/715,887 dated Jan. 14, 2020.

U.S. Patent Office; Office Action issued in U.S. Appl. No. 16/214,981 dated Nov. 10, 2020.

U.S. Patent Office; Notice of Allowance issued in U.S. Appl. No. 16/214,981 dated Feb. 17, 2021.

U.S. Patent Office; Ex Parte Quayle Action issued in U.S. Appl. No. 15/715,887 dated Jul. 17, 2019.

European Patent Office, Partial Supplementary European Search Report issued in Application No. 22790656.7, 18 pages, dated Aug. 21, 2023.

International Search Report and Written Opinion issued in application No. PCT/CN2022/085649; dated Jul. 6, 2022.

The State Intellectual Property Office of People's Republic of China, Notice of Grant issued in Application No. 202280003981.8, 3 pages, dated Jun. 26, 2024.

* cited by examiner

REFRIGERATOR WITH QUICK FILL DISPENSER INCORPORATING REMOVABLE FLUID STORAGE RECEPTACLE AND COMBINED INLET/OUTLET

BACKGROUND

Residential refrigerators generally include both fresh food compartments and freezer compartments, with the former maintained at a temperature above freezing to store fresh foods and liquids, and the latter maintained at a temperature below freezing for longer-term storage of frozen foods. Many residential refrigerators also include as a convenience feature an integrated dispenser for dispensing a fluid (e.g., water) and/or ice. In addition, some refrigerators incorporate a water tank or other fluid storage receptacle that may be fixed or removable, and positioned within a cooled compartment of the refrigerator to cool the contained fluid prior to dispensing or otherwise serving (e.g., in the case where the receptacle is removable). However, in many cases such dispensers are only capable of dispensing fluids at lower flow rates, and as a result, filling larger containers from a dispenser can take an inordinate amount of time with many dispensers.

SUMMARY

The herein-described embodiments address these and other problems associated with the art by providing a refrigerator that utilizes a quick fill dispenser that incorporates a fluid storage receptacle that is easily removable for cleaning and/or dispensing independently of the refrigerator, and that is coupled to the refrigerator using a combined inlet/outlet. A dock closure may also be used to inhibit fluid flow through the combined inlet/outlet when the fluid storage receptacle is removed.

Therefore, consistent with one aspect of the invention, a refrigerator may include a cabinet including a case having one or more food storage compartments defined therein and one or more doors positioned to insulate the one or more food storage compartments from an exterior environment, and a fluid dispenser coupled to the cabinet and including a fluid dispenser outlet configured to dispense a fluid in response to user input. The fluid dispenser may further include a splitter including first, second and third ports, a fill valve in upstream fluid communication with the first port of the splitter and configured to supply a fluid, a fluid dispensing valve in downstream fluid communication with the second port of the splitter and configured to regulate fluid flow to the fluid dispenser outlet, a dock in fluid communication with the third port of the splitter, a fluid storage receptacle removably supported by the dock and including a receptacle body configured to store fluid, and a combined inlet/outlet coupling the fluid storage receptacle to the dock to place the fluid storage receptacle in fluid communication with the splitter when the fluid storage receptacle is removably supported by the dock to both fill the fluid storage receptacle with fluid supplied by the fluid supply and dispense fluid through the fluid dispensing valve to the fluid dispenser outlet.

In some embodiments, the combined inlet/outlet includes an inlet/outlet port disposed on the fluid storage receptacle and a fill/dispense port disposed on the dock and configured to mate with the inlet/outlet port when the fluid storage receptacle is removably supported by the dock. Also, in some embodiments, the inlet/outlet port is downwardly facing. Further, in some embodiments, the inlet/outlet port is sized and configured to provide a fluid dispense rate to the fluid dispensing valve that is greater than a fluid supply rate provided to the inlet of the fluid storage receptacle by the fill valve.

In some embodiments, the inlet/outlet port further includes a seal assembly configured to seal the inlet/outlet port when the fluid storage receptacle is removed from the dock, the seal assembly is normally biased to a closed position and is movable to an open position when the fluid storage receptacle is supported by the dock, and the seal assembly includes a spring-loaded plunger having a sealing surface that seals the inlet/outlet port when in the closed position. In addition, in some embodiments, the inlet/outlet port of the fluid storage receptacle mates with the fill/dispense port of the dock along a mating axis, the spring-loaded plunger is movable along the mating axis, and the fill/dispense port of the dock includes an actuator configured to engage and displace the spring-loaded plunger along the mating axis when the fluid storage receptacle is supported by the dock and thereby move the seal assembly to the open position.

Some embodiments may also include a dock closure configured to inhibit fluid flow through the fill/dispense port when the fluid storage receptacle is removed from the dock to enable fluid to be dispensed from the fluid supply and through the fill valve, the splitter and the fluid dispensing valve to the fluid dispenser outlet when the fluid storage receptacle is removed from the dock. In some embodiments, the dock closure includes a manual closure that is manually coupled to the dock by a user when the fluid storage receptacle is removed from the dock. In addition, in some embodiments, the manual closure includes a stopper, a threaded cap or a door. Moreover, in some embodiments, the dock closure includes a fluid pressure-actuated mechanical valve that inhibits fluid flow through the fill/dispense port when the fluid storage receptacle is removed from the dock. In some embodiments, the dock closure includes a normally-closed seal assembly that is opened in response to the fluid storage receptacle being removably supported by the dock. Moreover, in some embodiments, the dock closure includes an electromechanical valve that is selectively actuated based at least in part on a state of a receptacle detector that is configured to detect when the fluid storage receptacle is removably supported by the dock.

In some embodiments, the fluid storage receptacle includes a bottom support surface configured to support the fluid storage receptacle on a flat surface when the fluid storage receptacle is removed from the dock, and the inlet/outlet port is recessed within the bottom support surface. In addition, in some embodiments, the fluid storage receptacle includes a bottom skirt that extends about at least a portion of a periphery of the fluid storage receptacle and below the inlet/outlet port, and at least a portion of the bottom support surface is defined by the bottom skirt.

In some embodiments, the dock is mounted on a first door among the one or more doors, the fluid storage receptacle is accessible from an interior side of the first door, and the fluid dispenser outlet is an externally-accessible fluid dispenser outlet configured to dispense fluid when the one or more doors are in a closed position. Moreover, in some embodiments, the dock is mounted within a receptacle compartment in the first door, the fluid storage receptacle is received within the receptacle compartment when supported by the dock, and the first door further includes a removable panel that covers the receptacle compartment.

In addition, some embodiments may further include a controller coupled to the fill valve, the fluid dispensing valve and a fluid level sensor positioned to sense a level of fluid in the fluid storage receptacle, the controller configured to selectively activate the fill valve to fill the fluid storage receptacle in response to the level of the fluid sensed by the fluid level sensor falling below a predetermined level, and to selectively activate the fluid dispensing valve in response to user input to perform a quick fill operation at a flow rate that is greater than the fluid supply rate. In some embodiments, the controller is further configured to activate the fill valve while activating the dispensing valve during the quick fill operation such that fluid output by the fluid dispenser outlet includes fluid supplied by the fluid storage receptacle and fluid supplied by the fill valve. In addition, in some embodiments, the controller is further configured to activate the fill valve while activating the dispensing valve when the fluid storage receptacle is removed from the dock.

In addition, some embodiments may further include a receptacle detector coupled to the controller and configured to detect when the fluid storage receptacle is removably supported by the dock, and the controller is configured to activate the fill valve while activating the dispensing valve in response to user input when the receptacle detector detects that the fluid storage receptacle is removed from the dock.

Consistent with another aspect of the invention, a fluid storage receptacle may be provided for use in a fluid dispenser disposed in a refrigerator of a type including a case having one or more food storage compartments defined therein and one or more doors positioned to insulate the one or more food storage compartments from an exterior environment, where the fluid dispenser is of a type including a dock in upstream communication with a fluid dispensing valve. The fluid storage receptacle may include a receptacle body configured to store a fluid, and a combined inlet/outlet port configured to receive fluid from a fill valve of the fluid dispenser when the receptacle body is removably supported by the dock and to supply fluid stored in the receptacle body to the fluid dispensing valve of the fluid dispenser when the receptacle body is removably supported by the dock, where the combined inlet/outlet port is downwardly-facing to mate with an upwardly-facing fill/dispense port of the dock when the receptacle body is removably supported by the dock, and the combined inlet/outlet port is sized and configured to provide a fluid dispense rate to the fluid dispensing valve that is greater than a fluid supply rate provided by the fill valve.

Consistent with another aspect of the invention, a fluid dispenser disposed in a refrigerator of a type including a case having one or more food storage compartments defined therein and one or more doors positioned to insulate the one or more food storage compartments from an exterior environment may include a fluid dispenser outlet configured to dispense a fluid in response to user input, a fluid dispensing valve configured to regulate fluid flow to the fluid dispenser outlet, a fill valve in upstream fluid communication with the fluid dispensing valve and configured to supply a fluid, a dock in upstream fluid communication with the fluid dispensing valve and in downstream fluid communication with the fill valve, the dock configured to removably support a fluid storage receptacle and including at least one port through which fluid may flow between the dock and the fluid storage receptacle when the fluid storage receptacle is removably supported by the dock, and a dock closure configured to inhibit fluid flow through the port when the fluid storage receptacle is removed from the dock to enable fluid from the fill valve to be dispensed to the fluid dispenser outlet when the fluid storage receptacle is removed from the dock.

Moreover, in some embodiments, the dock closure includes a stopper, a threaded cap, a door, a fluid pressure-actuated mechanical valve that inhibits fluid flow through the port when the fluid storage receptacle is removed from the dock, a normally-closed seal assembly that is opened in response to the fluid storage receptacle being removably supported by the dock, or an electromechanical valve that is selectively actuated based at least in part on a state of a receptacle detector that is configured to detect when the fluid storage receptacle is removably supported by the dock.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
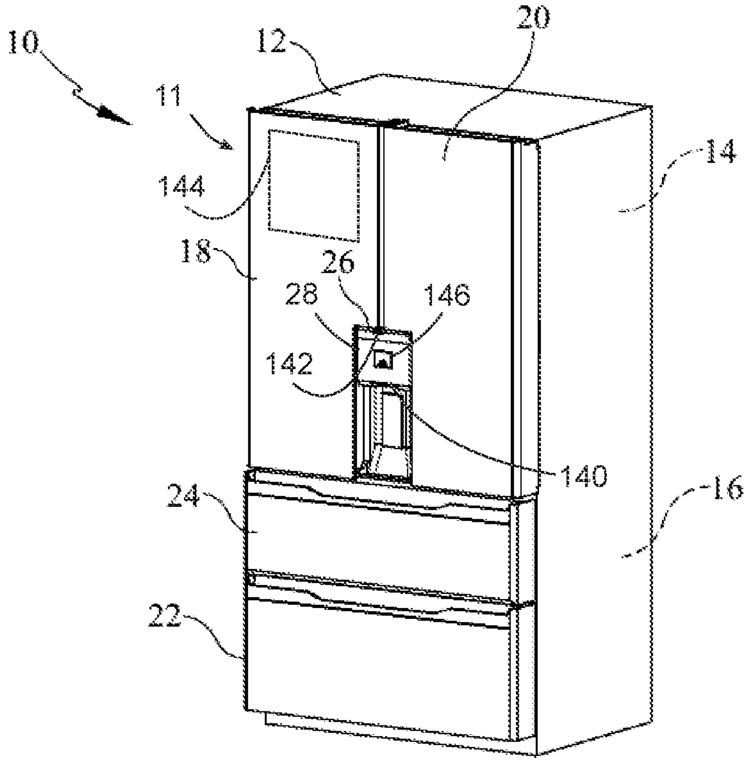
FIG. 1 is a perspective view of a refrigerator consistent with some embodiments of the invention.

Turning now to the drawings, wherein like numbers denote like parts throughout the several views, FIG. 1 illustrates an example refrigerator 10 in which the various technologies and techniques described herein may be implemented. Refrigerator 10 is a residential-type refrigerator, and as such includes a cabinet 11 including a case 12 (representing the fixed portion or main body of the refrigerator) having one or more food storage compartments (e.g., a fresh food compartment 14 and a freezer compartment 16), as well as one or more fresh food compartment doors 18, 20 and one or more freezer compartment doors 22, 24 disposed adjacent respective openings of food storage compartments 14, 16 and configured to insulate the respective food storage compartments 14, 16 from an exterior environment when the doors are closed.

Fresh food compartment 14 is generally maintained at a temperature above freezing for storing fresh food such as produce, drinks, eggs, condiments, lunchmeat, cheese, etc. Various shelves, drawers, and/or sub-compartments may be provided within fresh food compartment 14 for organizing foods, and it will be appreciated that some refrigerator designs may incorporate multiple fresh food compartments and/or zones that are maintained at different temperatures and/or at different humidity levels to optimize environmental conditions for different types of foods. Freezer compartment 16 is generally maintained at a temperature below freezing for longer-term storage of frozen foods, and may also include various shelves, drawers, and/or sub-compartments for organizing foods therein.

Refrigerator 10 as illustrated in FIG. 1 is a type of bottom mount refrigerator commonly referred to as a French door refrigerator, and includes a pair of side-by-side fresh food compartment doors 18, 20 that are hinged along the left and right sides of the refrigerator to provide a wide opening for accessing the fresh food compartment, as well as a pair of sliding freezer compartment doors 22, 24 that are similar to drawers and that pull out to provide access to items in the freezer compartment. Both the fresh food compartment and the freezer compartment may be considered to be full width as they extend substantially across the full width of the case 12. It will be appreciated, however, that other compartment door designs may be used in other embodiments, including various combinations and numbers of hinged and/or sliding doors for each of the fresh food and freezer compartments (e.g., a pair of French freezer doors, a single sliding freezer door, or one hinged fresh food and/or freezer door). Moreover, while refrigerator 10 is a bottom mount refrigerator with freezer compartment 16 disposed below fresh food compartment 14, the invention is not so limited, and as such, the principles and techniques may be used in connection with other types of refrigerators in other embodiments, e.g., top mount refrigerators, side-by-side refrigerators, etc.

Refrigerator 10 also includes a dispenser 26 for dispensing ice and/or a fluid such as water. In the illustrated embodiments, dispenser 26 is an ice and water dispenser capable of dispensing both ice (cubed and/or crushed) and chilled water, while in other embodiments, dispenser 26 may be a fluid only dispenser for dispensing various fluids such as chilled or cooled water, hot water, coffee, beverages, or other fluids, and may have variable rate and/or fast dispense capabilities, as well as an ability to dispense predetermined or measured quantities of fluids. In some instances, ice and water may be dispensed from the same location, while in other instances separate locations may be provided in the dispenser for dispensing ice and water.

Refrigerator 10 also includes a control panel 28, which in the illustrated embodiment forms at least a portion of an exterior surface of an ice compartment of case 12, and further is separate from a fresh food or freezer compartment door such as any of doors 18, 20, 22, and 24. Control panel 28 may include various input/output controls such as buttons, indicator lights, alphanumeric displays, dot matrix displays, touch-sensitive displays, etc. for interacting with a user. In other embodiments, control panel 28 may be separate from dispenser 26 (e.g., on a door), and in other embodiments, multiple control panels may be provided. Further, in some embodiments audio feedback may be provided to a user via one or more speakers, and in some embodiments, user input may be received via a spoken or gesture-based interface. Additional user controls may also be provided elsewhere on refrigerator 10, e.g., within fresh food and/or freezer compartments 14, 16. In addition, refrigerator 10 may be controllable remotely, e.g., via a smartphone, tablet, personal digital assistant or other networked computing device, e.g., using a web interface or a dedicated app.

Figure 2:
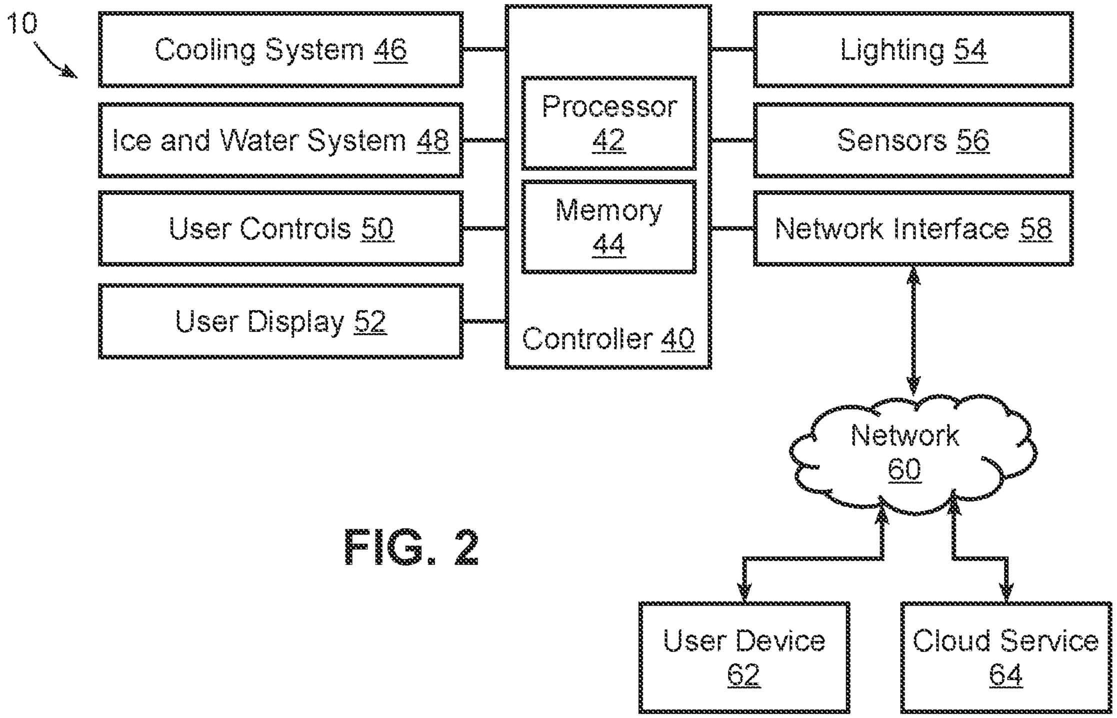
FIG. 2 is a block diagram of an example control system for the refrigerator of FIG. 1.

A refrigerator consistent with the invention also generally includes one or more controllers configured to control a refrigeration system as well as manage interaction with a user. FIG. 2, for example, illustrates an example embodiment of a refrigerator 10 including a controller 40 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40.

As shown in FIG. 2, controller 40 may be interfaced with various components, including a cooling or refrigeration system 46, an ice and water system 48, one or more user controls 50 for receiving user input (e.g., various combinations of switches, knobs, buttons, sliders, touchscreens or touch-sensitive displays, microphones or audio input devices, image capture devices, etc.), and one or more user displays 52 (including various indicators, graphical displays, textual displays, speakers, etc.), as well as various additional components suitable for use in a refrigerator, e.g., interior and/or exterior lighting 54, among others. At least a portion of user controls 50 and user displays 52 may be disposed, for example, on control panel 28 of FIG. 1.

Controller 40 may also be interfaced with various sensors 56 located to sense environmental conditions inside of and/or external to refrigerator 10, e.g., one or more temperature sensors, humidity sensors, etc. Such sensors may be internal or external to refrigerator 10, and may be coupled wirelessly to controller 40 in some embodiments. Sensors 56 may also include additional types of sensors such as door switches, switches that sense when a portion of an ice dispenser or a fluid storage receptacle has been removed, and other status sensors, as will become more apparent below.

In some embodiments, controller 40 may also be coupled to one or more network interfaces 58, e.g., for interfacing with external devices via wired and/or wireless networks such as Ethernet, Wi-Fi, Bluetooth, NFC, cellular and other suitable networks, collectively represented in FIG. 2 at 60. Network 60 may incorporate in some embodiments a home automation network, and various communication protocols may be supported, including various types of home automation communication protocols. In other embodiments, other wireless protocols, e.g., Wi-Fi or Bluetooth, may be used.

In some embodiments, refrigerator 10 may be interfaced with one or more user devices 62 over network 60, e.g., computers, tablets, smart phones, wearable devices, etc., and through which refrigerator 10 may be controlled and/or refrigerator 10 may provide user feedback. Refrigerator 10 may also be interfaced with one or more cloud services 64, e.g., to provide remote control, to communicate diagnostic information, etc.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the sequences of operations performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Figure 3:
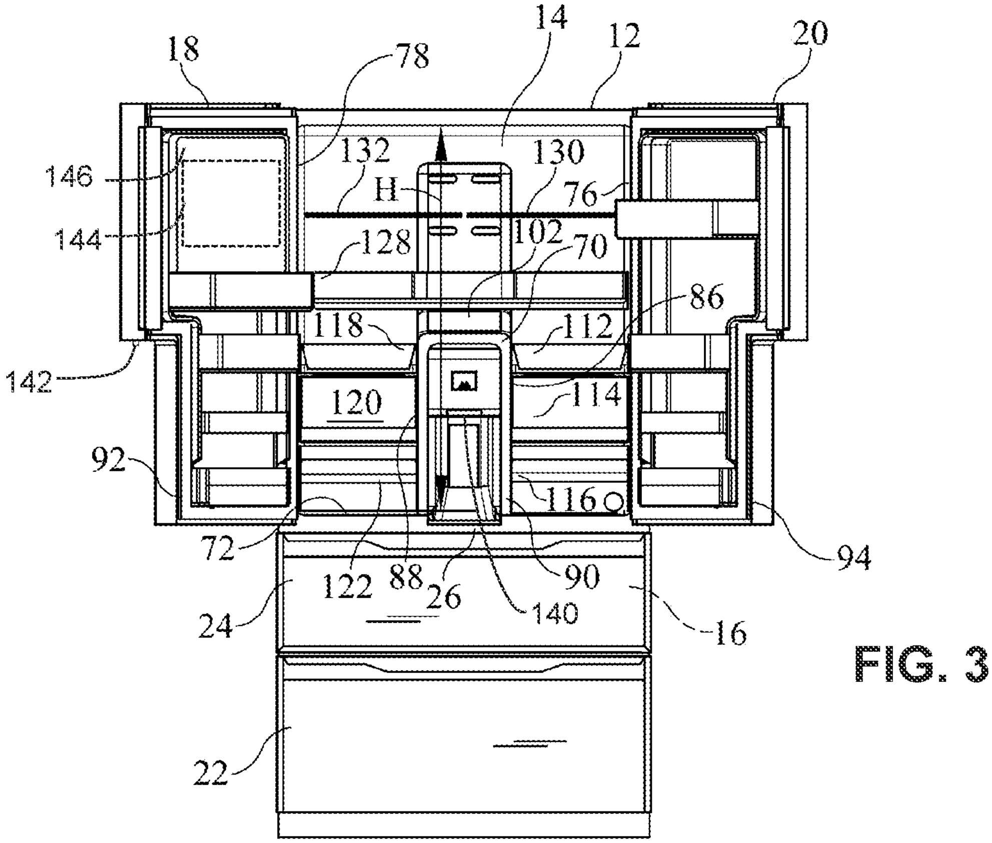
FIG. 3 is a front elevational view of the refrigerator of FIG. 1 with the fresh food compartment doors open.
Figure 4:
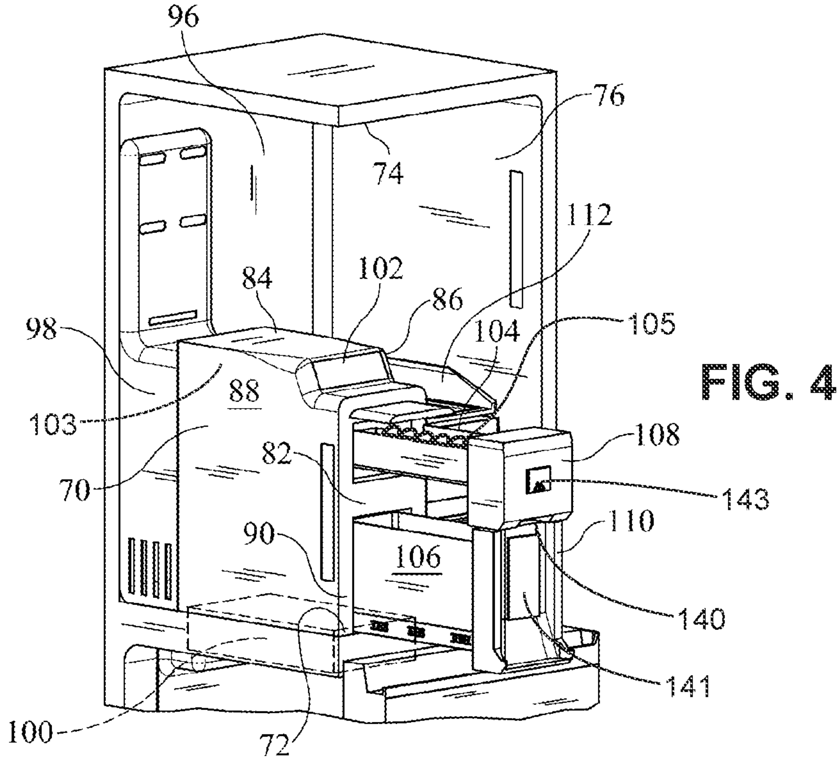
FIG. 4 is an exploded perspective view of the icemaking console for the refrigerator of FIG. 1.

Now turning to FIGS. 3 and 4, in some embodiments, a quick fill dispenser incorporating a removable fluid storage receptacle as described herein may be used in connection with an icemaking console disposed at least partially within a fresh food compartment and extending only a portion of the height of the fresh food compartment, e.g., as disclosed in U.S. Pub. No. 2019/0178556 and U.S. Pat. No. 10,837,690, both of which are incorporated by reference herein. In particular, an icemaking console 70 may be disposed in fresh food compartment 14 and may extend upwardly from a bottom wall 72 of the fresh food compartment 14 only a portion of a height H of the fresh food compartment and spaced apart from each of a top wall 74, right side wall 76, and left side wall 78 of the fresh food compartment. Console 70 may include a front wall 82, top wall 84, right side wall 86 and left side wall 88, and in some instances, at least portions of front wall 82 may be externally-accessible when doors 18, 20 are closed. In some instances, for example, front wall 82 may include a sealing surface 90 against which gaskets 92, 94 on doors 18, 20 may form a seal when doors 18, 20 are closed.

Console 70 may extend in some instances to a back wall 96 of fresh food compartment 14, while in other instances, and as shown in FIG. 4, a separate housing 98 may project from back wall 96 (e.g., formed integrally with back wall 96, or formed as a separate component that is fastened or otherwise attached to back wall 96). Housing 98 may be used, for example, to provide space for an evaporator and/or other cooling system component, for control electronics, for air ducts, or for other suitable purposes.

Moreover, the walls 82, 84, 86 and 88 of console 70 may be insulated (e.g., via foam or another suitable insulator) such that console 70 is an insulated console and such that an interior compartment of console 70 is maintained at a below-freezing temperature for the purposes of making and storing ice. In the illustrated embodiment, console 70 is in fluid communication with freezer compartment 16 through an opening 100 formed in bottom wall 72 of fresh food compartment 14, such that while console 70 is physically disposed within the boundary of fresh food compartment 14, the interior of console 70 is insulated from the fresh food compartment and in fluid communication with freezer compartment 16, thus effectively operating as an extension of freezer compartment 16. In other embodiments, console 70 may be separate from freezer compartment 16, e.g., insulated from freezer compartment 16 and including a separate cooling system, e.g., a thermoelectric cooling system, or separated from freezer compartment 16 but fluidly coupled via ducts or vents to receive cool air circulated by the freezer compartment cooling system. In each instance, however, the interior of console 70 may be considered to be a compartment that is separate from the food storage compartments (fresh food compartment 14 and freezer compartment 16) of refrigerator 10.

Further, it will be appreciated that console 70 is formed separate from the shell or liner used to form the fresh food and/or freezer compartments. In other embodiments, however, console 70 may be formed integrally with the shell or liner of a fresh food and/or freezer compartment.

Console 70 in some embodiments may also provide a convenient location for a control panel 102 suitable for controlling various functions of refrigerator 10. For example, control panel 102 may include displays, buttons, sliders, switches, etc., and may be used to perform various control operations such as setting temperature setpoints, controlling ice and/or water functions, displaying alarms or alerts, etc. As shown in the illustrated embodiment, top wall 84 of console 70 may be bi-level to accommodate control panel 102, although in other embodiments, no control panel may be used, and top wall 84 may be at a substantially consistent elevation along its depth.

Console 70 in some instances may be an icemaking console insofar as the console is used to make, dispense and/or store ice, e.g., as may be produced by an icemaker 103. As will become more apparent below, however, console 70 may not be an icemaking console in some embodiments. In some embodiments, however, console 70 may be configured to receive one or more drawers or storage bins, e.g., upper and lower ice storage bins 104, 106, with an ice dispenser 105 (e.g., a driven auger with selective crushing capability) disposed in upper ice storage bin 104. Upper ice storage bin 104 includes a front face 108 that insulates console 70 from the external environment when the bin is pushed into the console and forms a front surface of the upper ice storage bin, while lower ice storage bin 106 includes a front face 110 that similarly insulates console 70 from the external environment when the bin is pushed into the console and forms a front surface of the lower ice storage bin. Front faces 108, 110 also house at least a portion of an externally-accessible ice and water dispenser, discussed in greater detail below. In some embodiments, a single front face may be used, whereby the upper and lower ice storage bins may be coupled to the same front face.

Beyond ice-related functions, however, console 70 also provides a number of structural features associated with the storage of food items within fresh food compartment 14. For example, side walls 86, 88 of console 70 respectively face side walls 76, 78 of fresh food compartment 14, and may provide structural support for one or more sliding storage elements (e.g., storage elements 112, 114, 116, 118, 120, 122) within fresh food compartment 14. A storage element within the context of the disclosure may include any structural member capable of storing or otherwise supporting a food item, e.g., a shelf, a basket, a storage bin, a drawer, a rack, etc., and a sliding storage element may be considered to be a storage element capable of sliding within a horizontal plane, e.g., along a generally horizontal axis extending from the rear to the front of refrigerator 10.

Storage elements 112 and 118, for example, are sliding shelves, while storage elements 114, 116, 120 and 122 are sliding storage bins or drawers. It will also be appreciated that storage bins or drawers may be configured with customizable environmental conditions (e.g., different temperatures, humidity levels, etc.) suitable for storing food items such as meats, cheeses, vegetables, fruits, etc. Further, not all of storage elements 114-122 need be configured as sliding storage elements, and moreover, different numbers and types of storage elements may be used for any of the storage elements illustrated in FIGS. 3-4, so the invention is not limited to the particular combination of storage elements illustrated herein. Console 70 may also provide structural support for storage elements located above the console, e.g., full width shelf 128, which is disposed underneath a pair of non-sliding shelves 130, 132 (which could also be sliding shelves in some embodiments as well).

With additional reference to FIG. 1, refrigerator 10 also includes an ice and water system including ice and water dispensers having respective ice dispenser and water dispenser outlets 140, 142 that, while outputting to the same general area, are separated from one another to the extent that ice dispenser outlet 140 is case-mounted and positioned within a dispenser opening to dispense ice from a case-mounted icemaker (icemaker 103), while water dispenser outlet 142 is door-mounted. Furthermore, despite the fact that water dispenser outlet 142 is door-mounted in refrigerator 10, a water dispenser control used to actuate the dispenser may be case-mounted in some embodiments. For example, in some embodiments, a water dispenser may be actuated by a water dispenser button or paddle 143 (FIG. 4), while in other embodiments, a water dispenser may be actuated by a control that is common to both the water dispenser and the ice dispenser, e.g., a button or paddle 141 (FIG. 4).

It will be appreciated, however, that in other embodiments, various components associated with a fluid and/or ice dispenser may be mounted on or within a door, on or within a case, or elsewhere in a refrigerator. Accordingly, the invention is not limited to the specific refrigerator and dispenser design illustrated in FIGS. 1-4.

As noted above, in embodiments consistent with the invention, a quick fill fluid dispenser, e.g., for dispensing a fluid such as chilled or cooled water, hot water, coffee, or another beverage, may incorporate a removable fluid storage receptacle consistent with some embodiments of the invention. With reference to FIG. 3, in some embodiments, a fluid storage receptacle, e.g., as represented at 144, may be disposed, for example, within a door of the refrigerator, e.g., door 18. As will also become more apparent below, in some embodiments a fluid storage receptacle may be disposed within an open recess or compartment in a door, while in other embodiments, e.g., as illustrated in FIG. 3, a fluid storage receptacle may be disposed within a closed compartment and accessed by removing or opening a door or panel 146 in a door. In still other embodiments, a fluid storage receptacle may be disposed elsewhere in other user-accessible locations, e.g., on or within case 11, or on or within another door of refrigerator 10.

Figure 5:
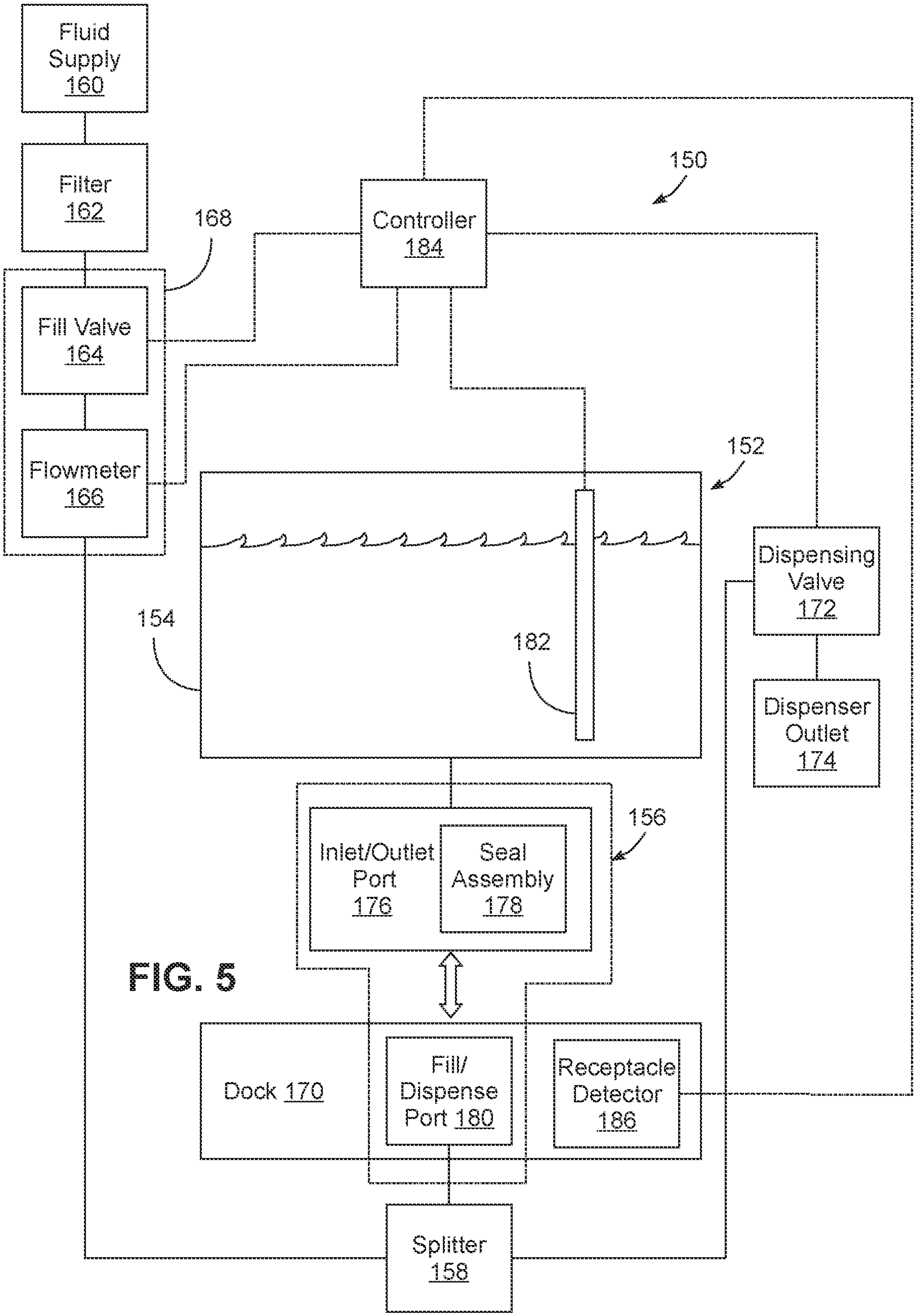
FIG. 5 is a block diagram of an example quick fill dispenser incorporating a removable fluid storage receptacle consistent with some embodiments of the invention.

Now turning to FIG. 5, this figure shows more generically a quick fill fluid dispensing system 150 suitable for use in a refrigerator such as refrigerator 10 of FIGS. 1-4, and incorporating a removable fluid storage receptacle 152 as described herein. Further details regarding the operation and configuration of a quick fill dispenser and/or a removable fluid storage receptacle may also be found in U.S. Pat. Nos. 10,563,909, 10,955,187, which are both incorporated by reference herein.

Fluid storage receptacle 152 includes a container body 154 that stores a fluid such as water, but differs from that disclosed in the aforementioned U.S. Pat. No. 10,955,187 in that fluid storage receptacle 152 forms a portion of a combined inlet/outlet 156 configured to both fill the receptacle with fluid and dispense fluid in the receptacle to a dispenser outlet through the same fluid path. Fluid is passed into and out of combined inlet/outlet 156 through a three-way splitter 158, e.g., a tee or wye fitting, which includes a first port that is in downstream fluid communication with a fluid supply 160 (e.g., a supply line configured to be coupled to a residential water source) through a filter 162 (which may be user-replaceable in some embodiments) and receptacle fill valve 164, the latter of which controls a flow of fluid into the fluid storage receptacle. In addition, in some embodiments a flowmeter 166 or other suitable sensor may also be in upstream fluid communication with splitter 158 to generate a signal representative of a volume of fluid entering receptacle 152 and/or dispensed (depending upon whether or not receptacle 152 is installed in the refrigerator). In some embodiments, valve 164 and flowmeter 166 may be separate components, while in other embodiments, and as illustrated by box 168, these components may be integrated with one another in the same housing or physical unit.

Fluid storage receptacle 152 is configured to be removably supported by a dock 170 that is in upstream communication with a fluid dispensing valve 172 that is coupled to a second port of splitter 158 and that regulates fluid flow to a fluid dispenser outlet 174, e.g., an internally-accessible or externally-accessible fluid dispenser outlet disposed on a door or case of a refrigerator. Dock 170 is coupled to a third port of splitter 158 such that fluid may be received from fill valve 164 through the first port of splitter 158 to fill fluid storage receptacle 152 and such that fluid may be dispensed from fluid storage receptacle 152 and to fluid dispenser outlet 174 through the second port of splitter 158.

Combined inlet/outlet 156 includes an inlet/outlet port 176 that is incorporated into fluid storage receptacle 152 and that includes a seal assembly 178 that seals the inlet/outlet port 176 when fluid storage receptacle 152 is removed from dock 170. Inlet/outlet port 176 in the illustrated embodiments is downwardly-facing, i.e., facing in a downward direction when fluid storage receptacle 152 is supported by dock 170 within a refrigerator, although it will be appreciated that other orientations (e.g., upward-facing, laterally-facing, or other angled orientations) may be used in other embodiments. Moreover, inlet/outlet port 176 is sized and configured to provide a fluid dispense rate to fluid dispensing valve 172 that is greater than a fluid supply rate provided to splitter 158 by fill valve 164, thereby providing a "quick fill" capability for the dispenser, at least for an amount of fluid corresponding to at least a portion of the fluid retained in fluid storage receptacle 152. Further, in the illustrated embodiment receptacle 152 is vented (e.g., in a lid thereof) to enable quick fill capability to be achieved via gravity flow and without the use of a pump (although a pump could be used in some embodiments).

Combined inlet/outlet 156 also includes an upwardly-facing fill/dispense port 180 in dock 170 that is configured to mate with inlet/outlet port 176 such that, when mated, fluid storage receptacle 152 is placed in fluid communication with both fill valve 164 (through one port of splitter 158) and dispensing valve 172 (through another port of splitter 158). As will also become more apparent below, in some embodiments mating of inlet/outlet port 176 and fill/dispense port 180 may automatically open seal assembly 178 to permit fluid to flow through ports 176, 180 when fluid storage receptacle 152 is supported by dock 170.

In addition, in some embodiments, a fluid level sensor 182, e.g., a conductivity sensor mounted on a wall of receptacle 152, an ultrasonic sensor positioned to sense a water surface within receptacle 152, a magnetic float sensor, or another suitable sensor disposed either internal to receptacle 152 or external from receptacle 152, may be downstream of flowmeter 166 and positioned to generate a signal representative of a level of fluid in the receptacle, which in some embodiments may also be usable to represent a volume of fluid exiting the outlet of the fluid storage receptacle during dispensing. In other embodiments, a flowmeter may be used downstream of inlet/outlet port 176 to sense the volume of fluid being dispensed. It will be appreciated that volume measurements may be desirable in some embodiments to provide feedback to a user as to the amount of fluid being dispensed and/or to provide a measured fill capability whereby the dispenser automatically shuts off when a user-selected amount of fluid has been dispensed. In other embodiments, however, no volume measurements may be used, although it may still be desirable to include a fluid level sensor, a float switch or other suitable component to cause fluid storage receptacle 152 to be maintained in a substantially filled state whenever docked in dock 170 and to otherwise inhibit overfilling of the receptacle.

Each of valves 164, 172 and sensors 166, 182 is additionally coupled to a controller 184 to enable the controller to selectively activate dispensing valve 172 in response to user input to dispense fluid from fluid storage receptacle 152 (e.g., to perform a quick fill or dispense operation at a flow rate that is greater than the fluid supply rate), to selectively activate fill valve 164 to fill receptacle 152 in response to the level of the fluid sensed by sensor 182 falling below a predetermined level, and in some embodiments to determine a volume of fluid dispensed through dispensing valve 172 using signals generated by sensors 166, 182. It may also be desirable in some embodiments to also include a receptacle detector 186, e.g., a switch or other presence detector, to detect when receptacle 152 is properly docked with dock 170, e.g., to enable each of valves 164, 172 to be disabled whenever receptacle 152 has been removed from dock 170, or to dispense fluid through dispenser outlet 174 without the use of fluid from fluid storage receptacle 152 when fluid storage receptacle 152 is not docked in dock 170.

It will be appreciated that a number of the components illustrated in FIG. 5 may be combined into the same physical unit or separated into multiple physical units and/or may be rearranged in other embodiments. It will also be appreciated that controller 184 in some embodiments may be implemented as an electronic circuit that controls valves 164 and 172 based upon a user control such as a paddle in combination with the fluid level sensed by sensor 182, and in some embodiments, also based upon the presence or absence of the receptacle as detected by detector 186. As such, the invention is not limited to the particular arrangement of components illustrated in FIG. 5.

Figure 6:
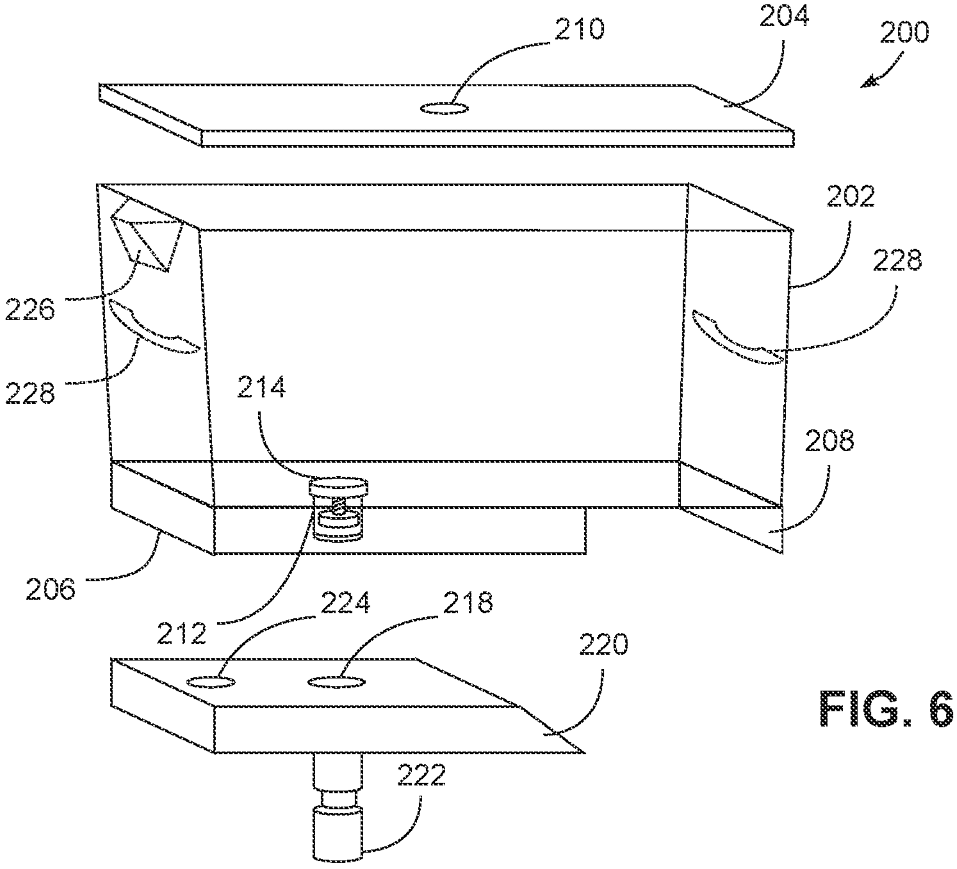
FIG. 6 is an exploded perspective view of an example removable fluid storage receptacle and dock consistent with some embodiments of the invention.

FIG. 6 illustrates an example implementation of a removable fluid storage container 200 consistent with some embodiments of the invention. A container body 202, e.g., formed of a clear, translucent or opaque plastic or another suitable material, may have an open top that is closed by a removable lid or top 204. Container body 202 includes a bottom support surface 206, e.g., defined on a bottom skirt 208 that extends around at least a portion of a periphery of body 202, which may be used to support the receptacle on a flat surface such as a table or countertop when the receptacle is removed from the dock. A vent 210 may also be provided on container body 202 or top 204 to vent the receptacle. A downwardly-facing inlet/outlet port 212 is provided in a bottom wall of receptacle 200 to receive a fluid such as water to fill the receptacle and to dispense fluid such as water to a dispensing outlet, and in some embodiments, the inlet/outlet port 212 may include a seal assembly 214 to close the inlet/outlet port 212 when the receptacle is removed from a refrigerator.

In the illustrated embodiment, inlet/outlet port 212 mates with a fill/dispensing port 218 in a dock 220 to receive and/or output fluid stored in receptacle 200 through a coupler 222 to place the receptacle in fluid communication both with an upstream fill valve and a downstream dispensing valve through a splitter (not shown in FIG. 6). Dock 220 may also include a receptacle detector 224 (e.g., a pressure-sensitive switch) that senses when receptacle 200 is supported by dock 220.

It will be appreciated that receptacle 200 may include additional components in some embodiments, e.g., a pour spout 226 for use in pouring fluid from the fluid storage receptacle when the fluid storage receptacle is removed from the dock, one or more handles 228 for use in carrying the fluid storage receptacle when the fluid storage receptacle is removed from the dock. Additional components, e.g., a user-actuated dispensing valve, a top-mounted handle, one or more latches to secure the top to the container body, may also be included on receptacle 200 in other embodiments.

Figure 7:
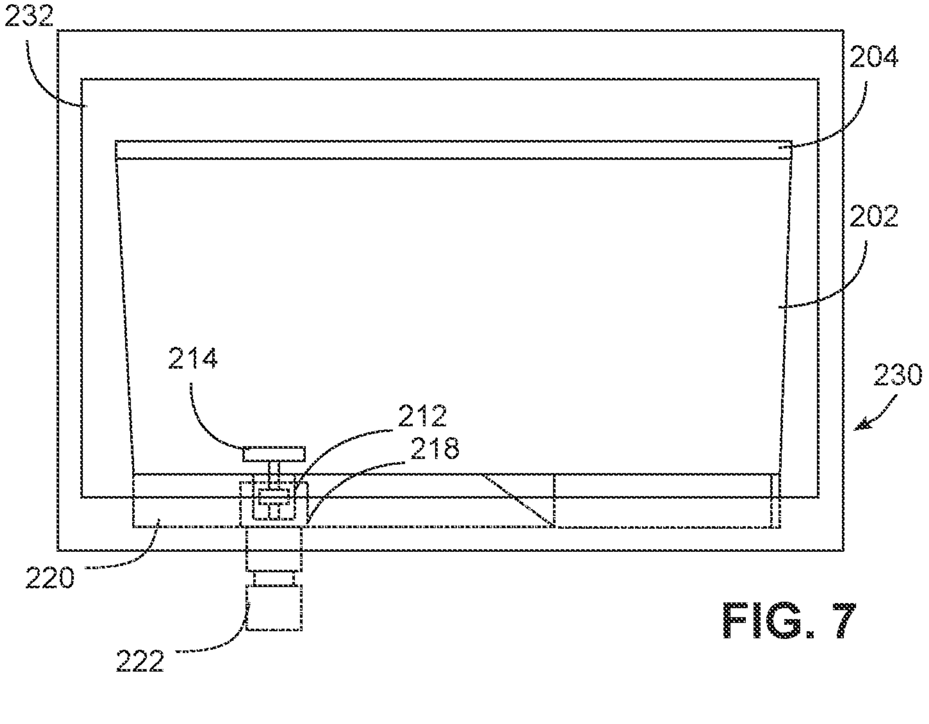
FIG. 7 is an elevational view of an interior side of an example refrigerator door, and illustrating the fluid storage receptacle and dock of FIG. 6 mounted therein.
Figure 8:
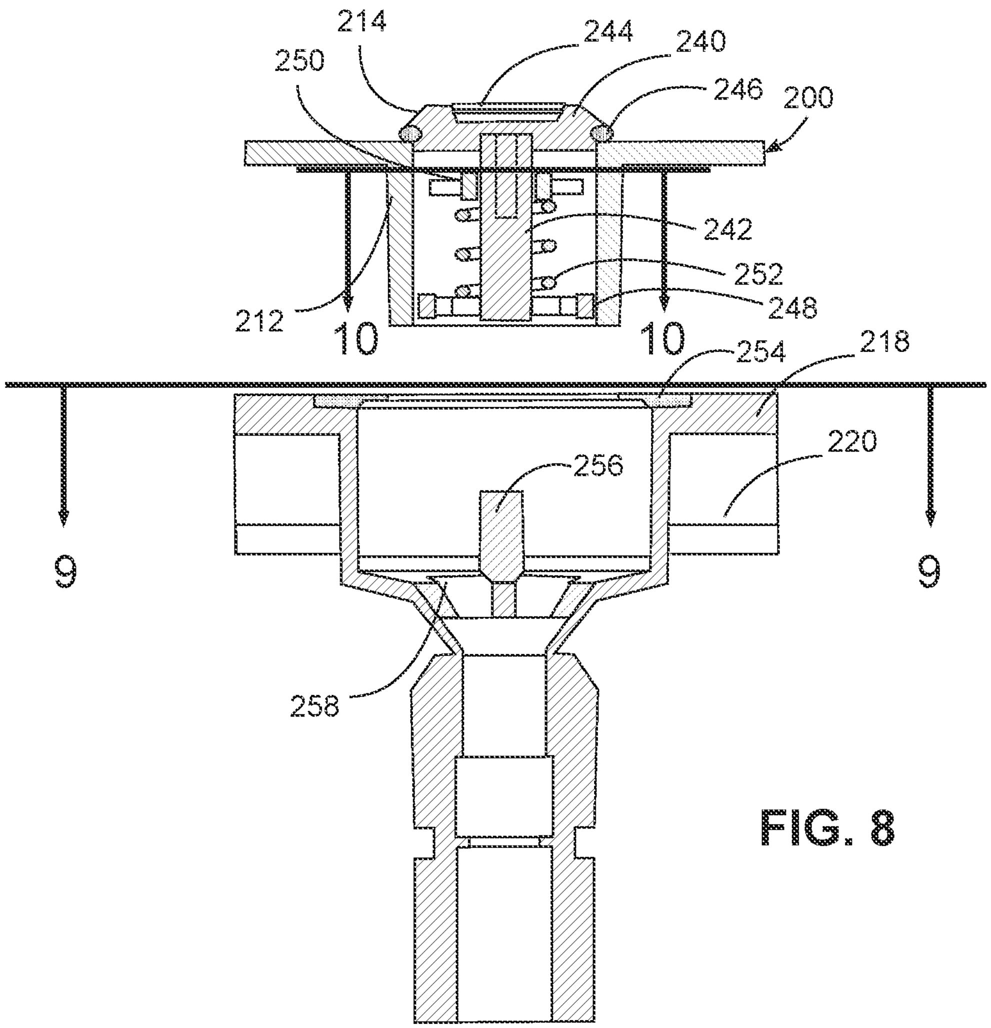
FIG. 8 is a side cross-sectional view of a seal assembly and docking arrangement between the fluid storage receptacle and dock of FIG. 6.
Figure 9:
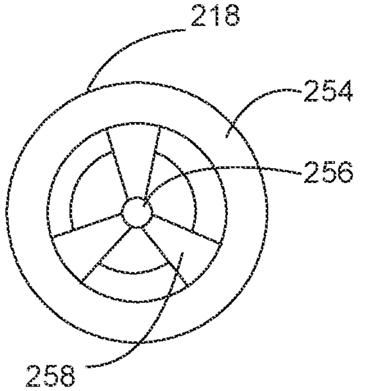
FIG. 9 is a top plan view of the dock of FIG. 6, taken along lines 9-9.
Figure 10:
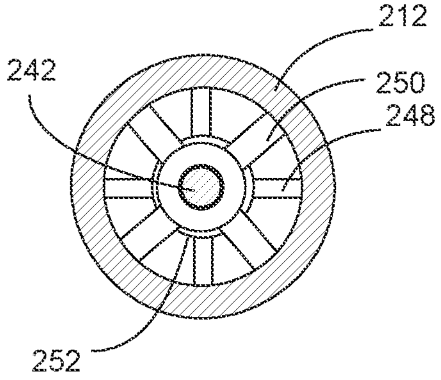
FIG. 10 is a top cross-sectional view of the sealing assembly of FIG. 6, taken along lines 10-10.

As noted above, a removable fluid storage receptacle may be disposed at various locations in a refrigerator. FIG. 7, for example, illustrates an interior side of a door 230, with receptacle 200 received within a receptacle compartment 232 defined in the door and supported by dock 220, which is fixedly mounted in door 230. As noted above, receptacle compartment 232 may be open in some embodiments, as illustrated in FIG. 7, while in other embodiments, a removable door or panel may cover the receptacle compartment, as illustrated in FIG. 3.

Now turning to FIGS. 8-11, an example seal assembly 214 docking arrangement suitable for use in receptacle 200 is illustrated in greater detail. Seal assembly 214 is used to seal inlet/outlet port 212 when fluid storage receptacle 200 is removed from dock 220, and as such may be normally biased to a closed position and automatically moved to an open position when the receptacle is mated with the dock. In some embodiments, for example, seal assembly 214 may include a spring-loaded plunger having a plunger body 240 that is mated with a central shaft 242 via a plug 244 and that includes an O-ring 246 to form a sealing surface that seals inlet/outlet port 212. Shaft 242 includes ported flange 248 that permits fluid flow therethrough (see FIG. 10) and is supported by a ported support 250 formed on or otherwise mounted to inlet/outlet port 212 and also permitting fluid flow therethrough. A coiled spring 252 is positioned between ported flange 248 and ported support 250 to bias plunger body 240 to a closed position where O-ring 246 forms a seal between plunger body 240 and inlet/outlet port 212.

Figure 11:
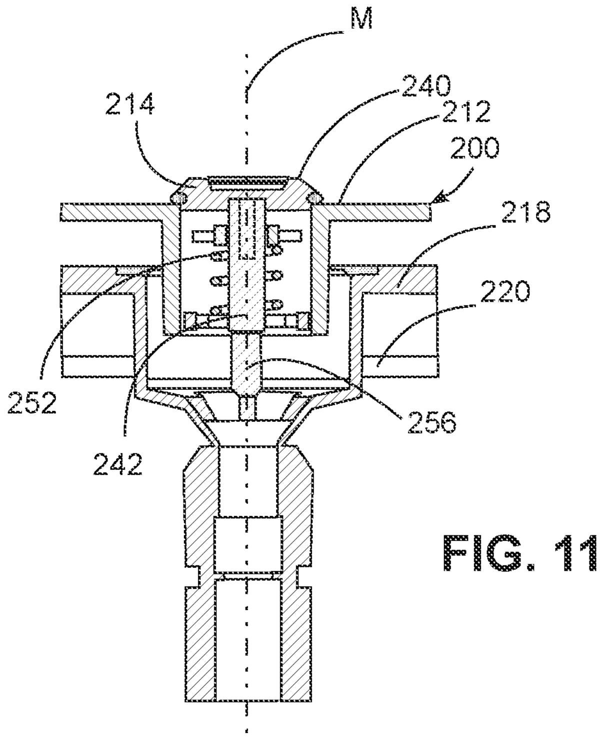
FIGS. 11 and 12 are side cross-sectional views of the seal assembly and docking arrangement of FIG. 6, and illustrating docking of the removable fluid storage receptacle with the dock.
Figure 12:
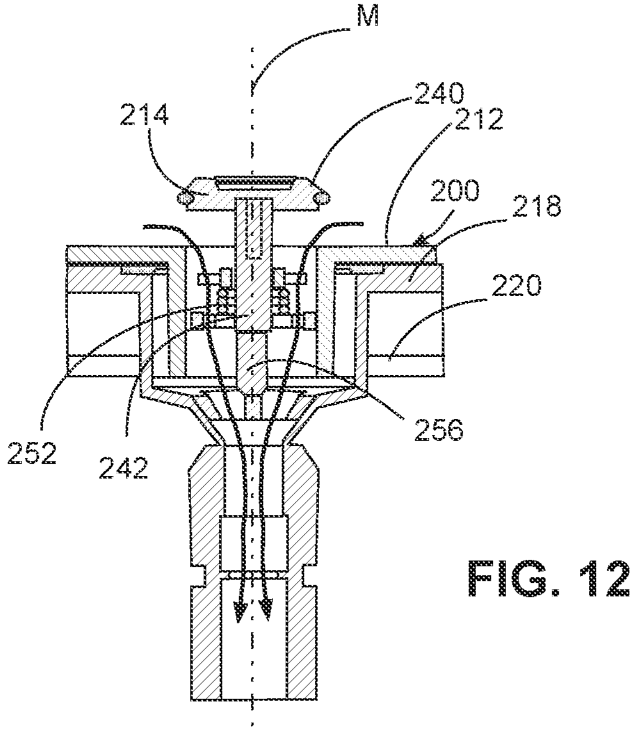

Fill/dispense port 218 in dock 220 includes an annular seal 254 that forms a seal when inlet/outlet port 212 is mated with fill/dispense port 218, fill/dispense port 218 also includes an actuator, e.g., a fixed shaft 256 supported by a ported support 258, which is used to engage and displace plunger body 240 to move the seal assembly 214 to an open position. FIGS. 11 and 12, for example, illustrate actuation of seal assembly 214 during docking of fluid storage receptacle 200 with dock 220. In particular, FIG. 11 illustrates inlet/outlet port 212 moving along a mating axis M from the position illustrated in FIG. 8 to a position where shaft 242 of the spring-loaded plunger first engages actuator 256 of fill/dispense port 218. Further movement of inlet/outlet port 212 along mating axis M to the position illustrated in FIG. 12 causes actuator 256 to displace shaft 242 along the mating axis M, compressing spring 252 and separating plunger body 240 from inlet/outlet port 212 to permit fluid flow through inlet/outlet port 212 and fill/dispense port 218. Further, it will be appreciated that annular seal 254 forms a seal between ports 212 and 218.

It will be appreciated that other seal assemblies may be used in other embodiments. Further, in some embodiments a movable actuator (e.g., driven by a solenoid) may be used to selectively open a seal assembly, rather than having the seal assembly automatically opened in response to docking of the receptacle with the dock.

Figure 13:
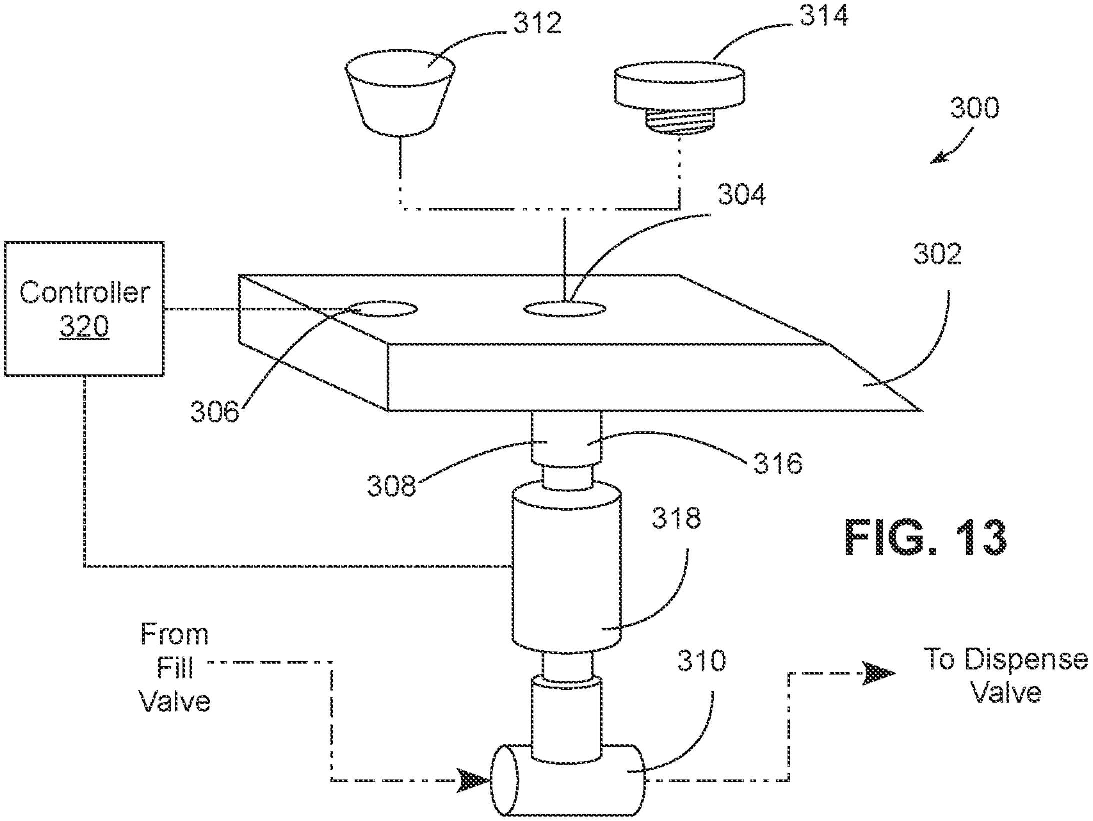
FIG. 13 is a perspective view of an example dock, and illustrating various types of dock closures for use in closing a combined dispense/fill port on the dock.

Now turning to FIG. 13, it may also be desirable in some embodiments to provide a dock closure for the fill/dispense port to which the inlet/outlet port of a fluid storage receptacle mates when the fluid storage receptacle is mated with a dock, as doing so enables the dispenser to be used even when the fluid storage receptacle has been removed from the refrigerator. FIG. 13, in particular, illustrates an example docking system 300 including a dock, a fill/dispense port 304 and a receptacle detector 306 similar to dock 220 of FIG. 6, and including a coupler 308 that is in fluid communication with a splitter 310. Docking system 300 also includes various types of dock closures capable of closing off fill/dispense port 304 to inhibit fluid flow from the fill valve through the fill/dispense port whenever no fluid storage receptacle is mated with the dock.

In some embodiments, for example, a manual closure such as an elastomeric stopper 312 or threaded cap 314 may be manually inserted by a user whenever the fluid storage receptacle is removed from the dock. Alternatively, a mechanical valve 316 may be incorporated into coupler 308 to operate as a mechanical closure. In some embodiments, the mechanical valve 316 may be fluid pressure-actuated such that the pressurized fluid is restricted from flowing from the fill valve and through the fill/dispense port 304 when no receptacle is present, while in some embodiments, mechanical valve 316 may incorporate a seal assembly similar to seal assembly 214 of FIGS. 8-11, but mounted within dock 302 and actuated by an actuator disposed on the receptacle.

As another alternative, an electromechanical valve 318 may be used in some embodiments as a dock closure, and may be actuated by a controller 318 whenever receptacle detector 306 detects the presence or absence of the receptacle docked with dock 302. Valve 318 may or may not be biased to an open or closed position, and may be implemented using a solenoid actuator, a rotary actuator, or practically any type of electromechanical valve as will be appreciated by those of ordinary skill having the benefit of the instant disclosure. Further, in some embodiments, electromechanical valve 318 may be integrated into splitter 310, such that in one mode, splitter 310 routes fluid from the fill valve to both fill/dispense port 304 and the dispensing valve, and in another mode, splitter 310 routes fluid only to the dispensing valve, bypassing the fill/dispense port altogether.

Figure 14:
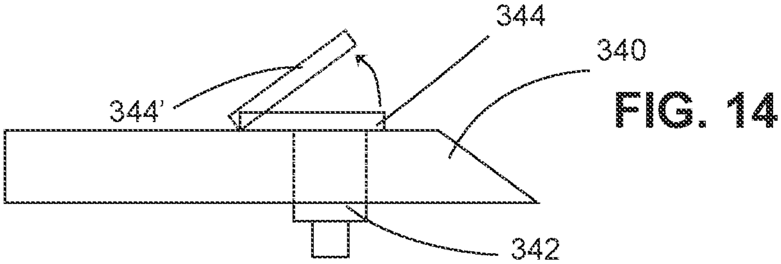
FIG. 14 is a perspective view of another example dock, and illustrating a door closure for use in closing a combined dispense/fill port on the dock.

FIG. 14 illustrates yet another dock closure variation, whereby a dock 340 includes a fill/dispense port 342 and a hinged door closure 344 that seals the fill/dispense port 342 when moved into the position illustrated in FIG. 14. When it is desirable to dock the receptacle, door 344 is rotated, e.g., as illustrated at 344', to open the fill/dispense port. In some embodiments, door 344 may be hinged or sliding, and may be biased to an open or closed position, and it may be necessary in some embodiments for a user to latch the door in either the open or closed position based upon whether the receptacle is going to be mated with the dock.

Figure 15:
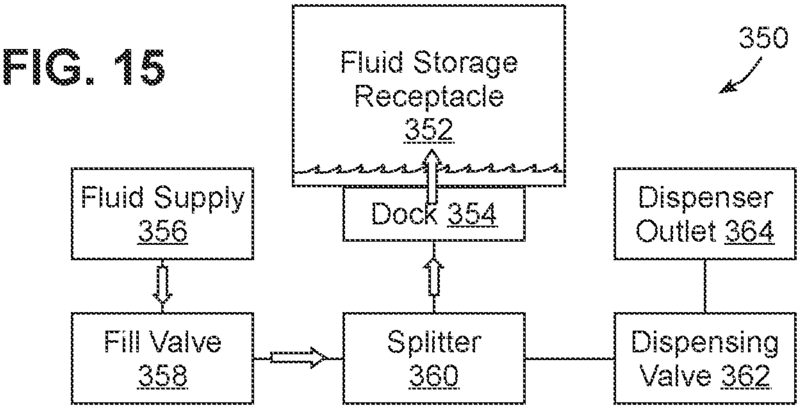
FIGS. 15-17 are functional block diagrams illustrating fluid flow in an example quick fill dispenser incorporating a removable fluid storage receptacle consistent with some embodiments of the invention.
Figure 16:
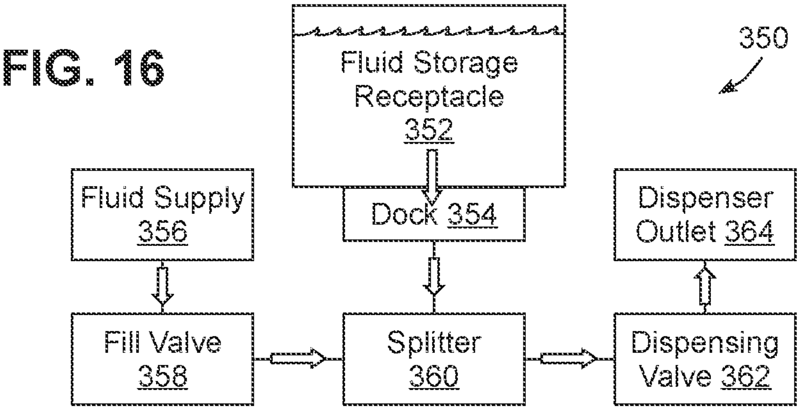
Figure 17:
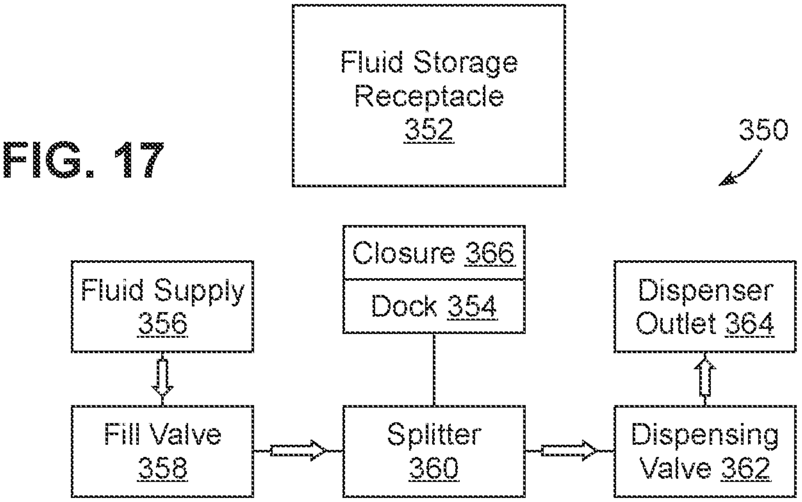

FIGS. 15-17 next illustrate the operation of an example quick fill dispenser 350 consistent with some embodiments. As shown in FIG. 15, a fluid storage receptacle 352 is docked in a dock 354 and is coupled to a fluid supply 356 through a fill valve 358 and splitter 360. Downstream of splitter 360 is a dispensing valve 362 that controls fluid flow to a dispenser outlet 364. Fluid storage receptacle 352 includes an inlet/outlet port that is mated with a corresponding fill/dispense port in dock 354 (not shown in FIG. 15) to provide a flow path from splitter 360 to receptacle 352. At this time, a controller may detect the receptacle using a detector as well as an empty state of the receptacle using a fluid level sensor (not shown in FIG. 15), and may activate fill valve 358 without activating dispensing valve 362 to cause fluid to flow from fluid supply 356, through fill valve 358 and splitter 360, through the fill/dispense port of dock 352 and the inlet/outlet port of receptacle 352 to begin to fill the receptacle. Once a full receptacle is detected by the fluid level sensor, fill valve 358 may be deactivated.

Thereafter, as illustrated in FIG. 16, if the user provides user input to dispense fluid (e.g., using a paddle), the controller may activate dispensing valve 362 to begin to dispense fluid through dispenser outlet 364, causing fluid to flow from receptacle 352, through dock 354, splitter 360, and dispensing valve 362, and out dispenser outlet 364. Moreover, given the aforementioned geometry of the receptacle and dock, a dispense rate may be provided that is generally greater than that which is made possible from fluid supply 356 alone. In addition, in some embodiments, fill valve 358 may also be activated when dispensing valve 362 is activated, such that the fluid flow to dispenser outlet 364 includes fluid flowing from both receptacle 352 and fluid supply 356. However, in some embodiments, fill valve 358 may be activated primarily based upon the fluid level sensed by the fluid level sensor and independent of the dispensing valve 362, such that the fill valve is only activated whenever the fluid level sensed by the fluid level sensor drops below a predetermined level.

Furthermore, as illustrated in FIG. 17, if the receptacle 352 is removed from the refrigerator, and user input is received to dispense fluid, the controller may activate both fill valve 358 and dispensing valve 362 to cause fluid to flow from fluid supply 356, through fill valve, 358, splitter 360, and dispensing valve 362 to dispenser outlet 364, without any fluid flow through the fill/dispense port of dock 354

(e.g., as a result of installation or activation of any of the manual, mechanical or electromechanical dock closures 366 discussed above). It will be appreciated, however, that fluid flow with the receptacle removed may be slower than when the receptacle is present; however, with this configuration use of the fluid dispenser is still allowed even when the receptacle has been removed. In the alternative, in some embodiments, dispensing may be disabled whenever receptacle 352 is removed.

As such, in the illustrated embodiments a quick fill fluid dispenser incorporates a fluid storage receptacle that is removable from the dispenser and includes a single inlet/outlet port for both filling and dispensing. In some embodiments, for example, such a receptacle may be useful when it is desirable to pour or otherwise dispense a large amount of cooled or chilled water. Such a receptacle may also be useful for cleaning purposes, e.g., to remove mold or mildew growth that may occur over time, and as such, a receptacle may be constructed to be dishwasher-safe in some embodiments.

It will be appreciated that various additional modifications may be made to the embodiments discussed herein, and that a number of the concepts disclosed herein may be used in combination with one another or may be used separately. Therefore, the invention lies in the claims hereinafter appended.

What is claimed is:

1. A refrigerator, comprising:

a cabinet including a case having one or more food storage compartments defined therein and one or more doors positioned to insulate the one or more food storage compartments from an exterior environment; and a fluid dispenser coupled to the cabinet and including a fluid dispenser outlet configured to dispense a fluid in response to user input, the fluid dispenser further including;

a splitter including first, second and third ports;

a fill valve in upstream fluid communication with the first port of the splitter and configured to supply a fluid;

a fluid dispensing valve in downstream fluid communication with the second port of the splitter and configured to regulate fluid flow to the fluid dispenser outlet;

a dock in fluid communication with the third port of the splitter;

a fluid storage receptacle removably supported by the dock and including a receptacle body configured to store fluid; and a combined inlet/outlet coupling the fluid storage receptacle to the dock to place the fluid storage receptacle in fluid communication with the splitter when the fluid storage receptacle is removably supported by the dock to both fill the fluid storage receptacle with fluid supplied by the fluid supply and dispense fluid through the fluid dispensing valve to the fluid dispenser outlet;

wherein the combined inlet/outlet includes an inlet/outlet port disposed on the fluid storage receptacle and a fill/dispense port disposed on the dock and configured to mate with the inlet/outlet port when the fluid storage receptacle is removably supported by the dock; and wherein the inlet/outlet port is sized and configured to provide a fluid dispense rate to the fluid dispensing valve that is greater than a fluid supply rate provided to the inlet of the fluid storage receptacle by the fill valve.

2. The refrigerator of claim 1, wherein the inlet/outlet port is downwardly facing.

3. The refrigerator of claim 1, wherein the fluid storage receptacle includes a bottom support surface configured to support the fluid storage receptacle on a flat surface when the fluid storage receptacle is removed from the dock, and wherein the inlet/outlet port is recessed within the bottom support surface.

4. The refrigerator of claim 1, wherein the fluid storage receptacle includes a bottom skirt that extends about at least a portion of a periphery of the fluid storage receptacle and below the inlet/outlet port, wherein at least a portion of the bottom support surface is defined by the bottom skirt.

5. The refrigerator of claim 1, wherein the dock is mounted on a first door among the one or more doors, wherein the fluid storage receptacle is accessible from an interior side of the first door, and wherein the fluid dispenser outlet is an externally-accessible fluid dispenser outlet configured to dispense fluid when the one or more doors are in a closed position.

6. The refrigerator of claim 5, wherein the dock is mounted within a receptacle compartment in the first door, wherein the fluid storage receptacle is received within the receptacle compartment when supported by the dock, and wherein the first door further includes a removable panel that covers the receptacle compartment.

7. A refrigerator, comprising:

a cabinet including a case having one or more food storage compartments defined therein and one or more doors positioned to insulate the one or more food storage compartments from an exterior environment; and a fluid dispenser coupled to the cabinet and including a fluid dispenser outlet configured to dispense a fluid in response to user input, the fluid dispenser further including:

a splitter including first, second and third ports;

a fill valve in upstream fluid communication with the first port of the splitter and configured to supply a fluid;

a fluid dispensing valve in downstream fluid communication with the second port of the splitter and configured to regulate fluid flow to the fluid dispenser outlet;

a dock in fluid communication with the third port of the splitter;

a fluid storage receptacle removably supported by the dock and including a receptacle body configured to store fluid; and a combined inlet/outlet coupling the fluid storage receptacle to the dock to place the fluid storage receptacle in fluid communication with the splitter when the fluid storage receptacle is removably supported by the dock to both fill the fluid storage receptacle with fluid supplied by the fluid supply and dispense fluid through the fluid dispensing valve to the fluid dispenser outlet;

wherein the combined inlet/outlet includes an inlet/outlet port disposed on the fluid storage receptacle and a fill/dispense port disposed on the dock and configured to mate with the inlet/outlet port when the fluid storage receptacle is removably supported by the dock; and wherein the inlet/outlet port further includes a seal assembly configured to seal the inlet/outlet port when the fluid storage receptacle is removed from the dock, wherein the seal assembly is normally biased to a closed position and is movable to an open position when the fluid storage receptacle is supported by the dock, and wherein the seal assembly includes a spring-loaded plunger having a sealing surface that seals the inlet/outlet port when in the closed position.

8. The refrigerator of claim 7, wherein the inlet/outlet port of the fluid storage receptacle mates with the fill dispense port of the dock along a mating axis, wherein the spring-loaded plunger is movable along the mating axis, and wherein the fill/dispense port of the dock includes an actuator configured to engage and displace the spring-loaded plunger along the mating axis when the fluid storage receptacle is supported by the dock and thereby move the seal assembly to the open position.

9. A refrigerator, comprising:

a cabinet including a case having one or more food storage compartments defined therein and one or more doors positioned to insulate the one or more food storage compartments from an exterior environment; and a fluid dispenser coupled to the cabinet and including a fluid dispenser outlet configured to dispense a fluid in response to user input, the fluid dispenser further including:

a splitter including first, second and third ports;

a fill valve in upstream fluid communication with the first port of the splitter and configured to supply a fluid;

fluid dispensing valve in downstream fluid communication with the second port of the splitter and configured to regulate fluid flow to the fluid dispenser outlet;

a dock in fluid communication with the third port of the splitter;

a fluid storage receptacle removably supported by the dock and including a receptacle body configured to store fluid; and a combined inlet/outlet coupling the fluid storage receptacle to the dock to place the fluid storage receptacle in fluid communication with the splitter when the fluid storage receptacle is removably supported by the dock to both fill the fluid storage receptacle with fluid supplied by the fluid supply and dispense fluid through the fluid dispensing valve to the fluid dispenser outlet;

wherein the combined inlet outlet includes an inlet outlet port disposed on the fluid storage receptacle and a fill/dispense port disposed on the dock and configured to mate with the inlet/outlet port when the fluid storage receptacle is removably supported by the dock; and wherein the refrigerator further includes a dock closure configured to inhibit fluid flow through the fill/dispense port when the fluid storage receptacle is removed from the dock to enable fluid to be dispensed from the fluid supply and through the fill valve, the splitter and the fluid dispensing valve to the fluid dispenser outlet when the fluid storage receptacle is removed from the dock.

10. The refrigerator of claim 9, wherein the dock closure comprises a manual closure that is manually coupled to the dock by a user when the fluid storage receptacle is removed from the dock.

11. The refrigerator of claim 10, wherein the manual closure comprises a stopper, a threaded cap or a door.

12. The refrigerator of claim 9, wherein the dock closure comprises a fluid pressure-actuated mechanical valve that inhibits fluid flow through the fill/dispense port when the fluid storage receptacle is removed from the dock.

13. The refrigerator of claim 9, wherein the dock closure comprises a normally-closed seal assembly that is opened in response to the fluid storage receptacle being removably supported by the dock.

14. The refrigerator of claim 9, wherein the dock closure comprises an electromechanical valve that is selectively actuated based at least in part on a state of a receptacle detector that is configured to detect when the fluid storage receptacle is removably supported by the dock.

15. A refrigerator, comprising:

a cabinet including a case having one or more food storage compartments defined therein and one or more doors positioned to insulate the one or more food storage compartments from an exterior environment; and a fluid dispenser coupled to the cabinet and including a fluid dispenser outlet configured to dispense a fluid in response to user input, the fluid dispenser further including:

a splitter including first, second and third ports;

a fill valve in upstream fluid communication with the first port of the splitter and configured to supply a fluid;

a fluid dispensing valve in downstream fluid communication with the second port of the splitter and configured to regulate fluid flow to the fluid dispenser outlet;

a dock in fluid communication with the third port of the splitter;

a fluid storage receptacle removably supported by the dock and including a receptacle body configured to store fluid; and a combined inlet/outlet coupling the fluid storage receptacle to the dock to place the fluid storage receptacle in fluid communication with the splitter when the fluid storage receptacle is removably supported by the dock to both fill the fluid storage receptacle with fluid supplied by the fluid supply and dispense fluid through the fluid dispensing valve to the fluid dispenser outlet;

wherein the refrigerator further includes a controller coupled to the fill valve, the fluid dispensing valve and a fluid level sensor positioned to sense a level of fluid in the fluid storage receptacle, the controller configured to selectively activate the fill valve to fill the fluid storage receptacle in response to the level of the fluid sensed by the fluid level sensor falling below a predetermined level, and to selectively activate the fluid dispensing valve in response to user input to perform a quick fill operation at a flow rate that is greater than the fluid supply rate.

16. The refrigerator of claim 15, wherein the controller is further configured to activate the fill valve while activating the dispensing valve during the quick fill operation such that fluid output by the fluid dispenser outlet includes fluid supplied by the fluid storage receptacle and fluid supplied by the fill valve.

17. The refrigerator of claim 15, wherein the controller is further configured to activate the fill valve while activating the dispensing valve when the fluid storage receptacle is removed from the dock.

18. The refrigerator of claim 17, further comprising a receptacle detector coupled to the controller and configured to detect when the fluid storage receptacle is removably supported by the dock, wherein the controller is configured to activate the fill valve while activating the dispensing valve in response to user input when the receptacle detector detects that the fluid storage receptacle is removed from the dock.

* * * * *